United States Patent [19]

Henderson

[11] 4,017,102

[45] * Apr. 12, 1977

[54] JACKET CONSTRUCTION FOR PIPE COUPLING

[75] Inventor: James R. Henderson, Charlotte, N.C.

[73] Assignee: Controls Southeast, Inc., Charlotte, N.C.

[ * ] Notice: The portion of the term of this patent subsequent to Aug. 26, 1992, has been disclaimed.

[22] Filed: June 16, 1975

[21] Appl. No.: 587,123

[52] U.S. Cl. .................... 285/41; 285/47; 285/363; 285/367

[51] Int. Cl.² ..................... F16L 53/00

[58] Field of Search ........... 285/41, 47, 363, 367; 138/32; 137/340, 375; 165/169, 47, 77

[56] References Cited

UNITED STATES PATENTS

| | | | |
|---|---|---|---|
| 2,732,227 | 1/1956 | Kaiser | 285/47 |
| 2,785,697 | 3/1957 | Sullender et al. | 137/340 |
| 3,146,005 | 8/1964 | Peyton | 285/47 |
| 3,199,898 | 8/1965 | Faccou | 285/41 |
| 3,377,463 | 4/1968 | Rolfes | 138/32 X |
| 3,439,910 | 4/1969 | Regelin et al. | 137/340 X |
| 3,563,571 | 2/1971 | Werra | 285/41 |
| 3,596,935 | 8/1971 | McGeoch | 285/41 X |
| 3,901,269 | 8/1975 | Henderson | 285/41 |

FOREIGN PATENTS OR APPLICATIONS

| | | | |
|---|---|---|---|
| 22,976 | 1902 | United Kingdom | 285/47 |
| 1,251,645 | 10/1971 | United Kingdom | 285/41 |

Primary Examiner—Thomas F. Callaghan
Attorney, Agent, or Firm—Bell, Seltzer, Park & Gibson

[57] ABSTRACT

To aid in maintaining a fluid flowing through a pipeline at a desired temperature at locations where two pipes are interconnected by a coupling, a jacket is provided which substantially surrounds and encloses the coupling and through which jacket a temperature controlling fluid is circulated in heat-transferring relation to the coupling.

12 Claims, 11 Drawing Figures

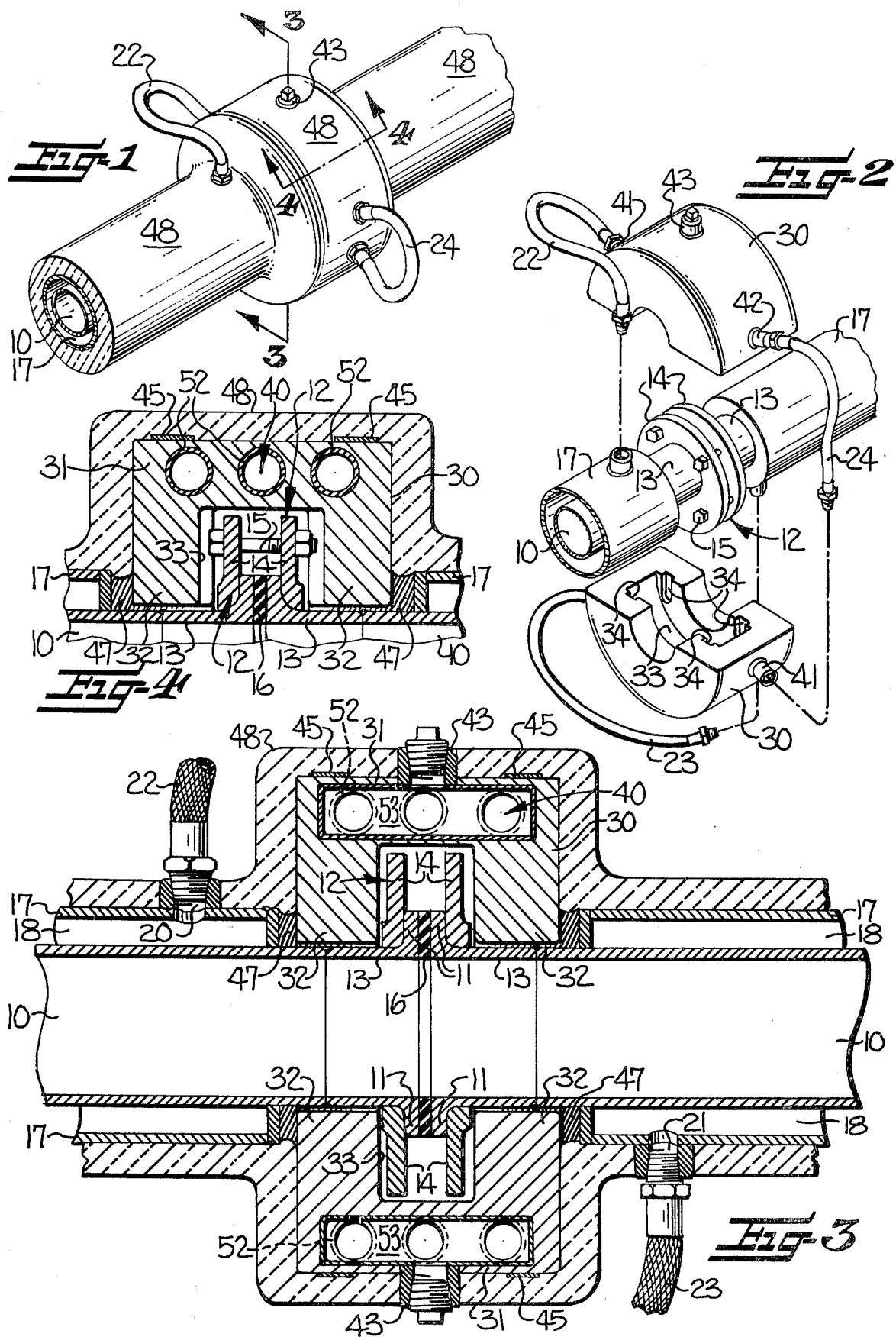

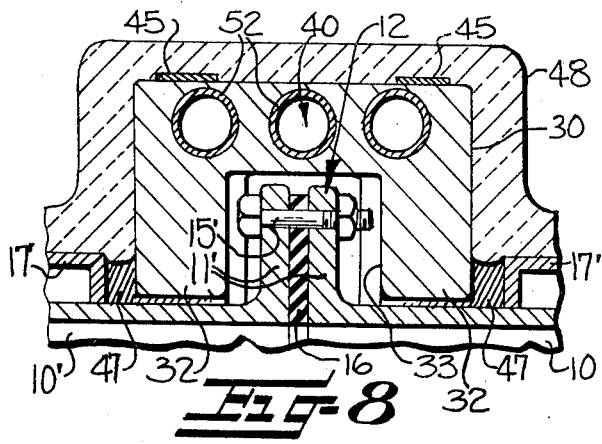
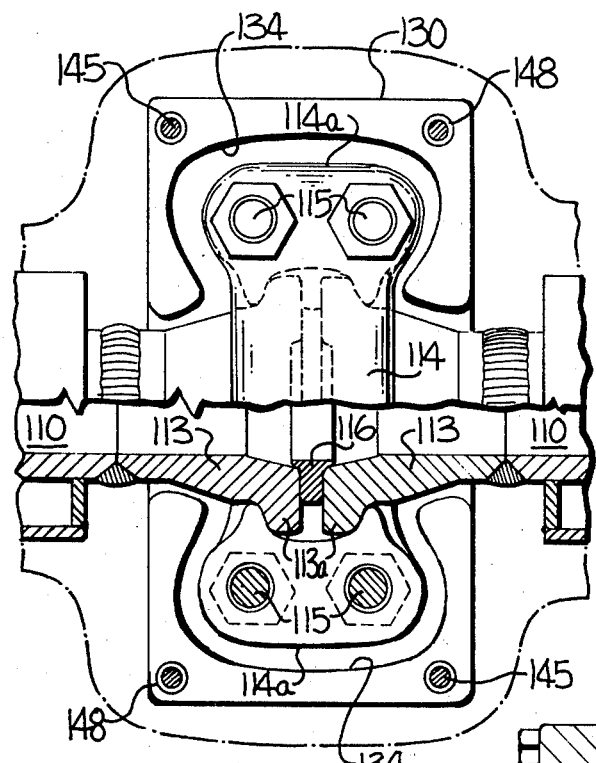
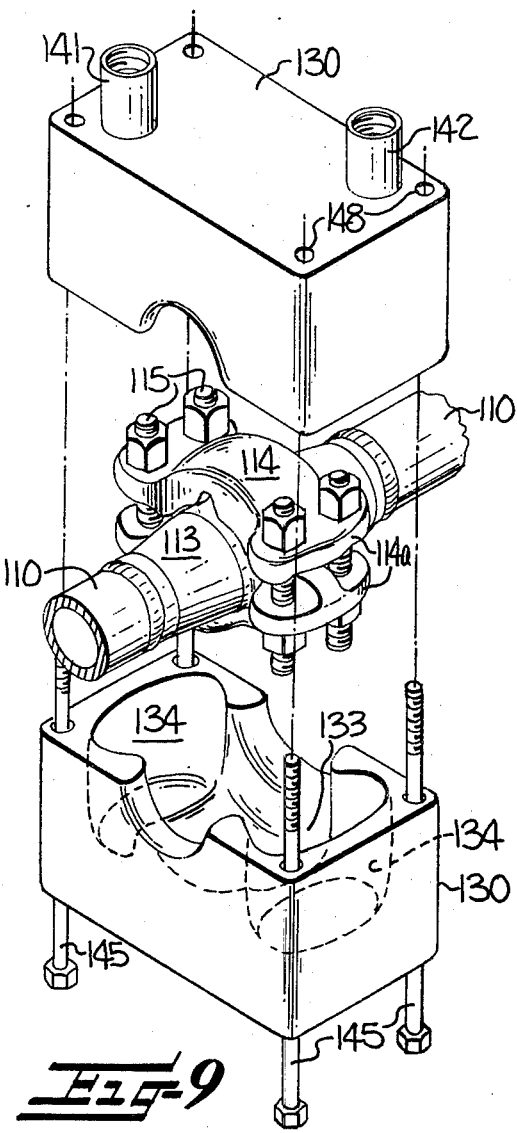
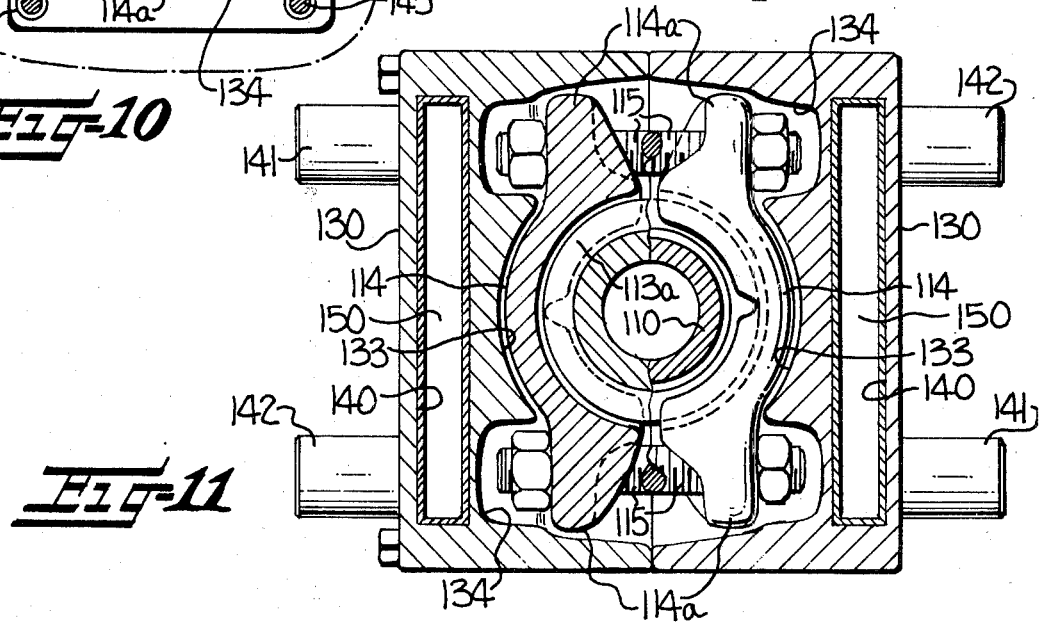

JACKET CONSTRUCTION FOR PIPE COUPLING

This invention relates to fluid conveying systems for hot and cold fluids, and more particularly to an improved jacket construction substantially surrounding the coupling interconnecting two pipes and through which jacket a temperature controlling fluid is circulated to aid in maintaining the fluid being conveyed through the pipeline at a desired optimum temperature.

In systems where fluids are conveyed along a pipeline at controlled temperatures, particularly at elevated temperatures, the relatively large mass of metal at the coupling where two pipes are interconnected operates as a heat sink to absorb heat from the fluid or from the surroundings. As a result, a significant differential in temperature may occur at this location along the pipeline.

In certain applications, as for example where the fluid being conveyed through the pipeline is heated to a molten state, some of the molten fluid may solidify at the interconnection of the two pipes due to the reduced pipe wall temperatures resulting from loss of heat from the coupling, and may cause undesirable obstruction to the flow of fluid through the pipeline.

It is customary practice, for the purpose of supplying needed heat to a fluid being conveyed through a pipeline, to provide steam jackets around pipes and pipe fittings such as valves or elbows by welding a wall around the body of the pipe or fitting. However, the provision of such welded jackets around a pipe coupling is both expensive and impractical.

Since most couplings are releasable connections intended to permit disconnection of two pipes, if necessary, for maintenance, making modifications, or for other reasons, the provision of a permanently installed welded jacket around the coupling would be impractical, preventing access to the pipe joint should this become necessary at a later time.

In addition, in forming such a jacket around a coupling, the welding can be effected only on the exterior surfaces of the jacket and thus the welded seams are not as strong as would be the case if the joints were welded from both sides. Thus, these exteriorly welded seams are susceptible of rupture under the high internal pressures and temperatures to which such jackets are generally subjected.

Thus, the conventional practice with regard to pipe couplings is to provide a heavy layer of insulation around the coupling in an effort to prevent or minimize heat loss from the coupling. While insulation alone is adequate in some installations, there are many installations where the application of additional heat to the pipe coupling is needed in order to maintain desirable fluid flow through the pipe.

With the foregoing in mind, it is a primary object of this invention to provide an improved, simple, effective and economical jacket construction for use with a pipe coupling, which jacket construction may be readily mounted on and detached from existing pipe couplings.

It is a more specific object of this invention to provide an improved jacket construction for directing a temperature controlling fluid into heat-transferring relation with the enlarged coupling serving to releasably interconnect a pair of pipes, and wherein the jacket construction comprises a plurality of blocks of heat conductive material cooperating with one another to substantially surround and enclose the enlarged coupling, with inner surface portions of each block being concave and defining a cavity of predetermined size and contour. The cavities of the cooperating blocks collectively define a hollow chamber within the cooperating blocks substantially conforming to the periphery of the enlarged coupling and receiving the coupling therein. Each block has a fluid passageway therein with inlet and outlet ports for circulation of a temperature controlling fluid through the passageway.

It is another more specific object of this invention to provide a jacket construction of the type described, wherein each block includes a hollow member of thin-wall heat conductive material defining the fluid passageway therethrough, with the walls of each block being molded around the hollow member. In the preferred embodiment of the invention, this hollow member takes the form of a pair of hollow headers embedded within the block at spaced locations from one another and each communicating with one of the inlet and outlet ports, and with a plurality of elongate tubular members extending through the block and communicatively interconnecting the pair of headers.

It is a further object of this invention to provide a jacket construction for use in association with various kinds of pipe couplings such as the conventional couplings for flanged end pipes, including both the type wherein fixed end flanges are bolted directly together and the type wherein loose draw rings are employed to secure the flanged end pipes together, and also including couplings particularly designed for high pressure application, such as "Grayloc" couplings, etc.

Some of the objects of the invention having been stated, others will appear as the description proceeds when taken in connection with the accompanying drawings, in which:

FIG. 1 is a perspective view of a pair of interconnected flanged end jacketed pipes, with a jacket construction in accordance with this invention being provided surrounding and enclosing the opposing interconnected end portions of the pipes, and with a layer of insulation being provided around both the jacket construction and the pipes;

FIG. 2 is a perspective view similar to FIG. 1, with the layer of insulation omitted and wherein the pair of blocks comprising the jacket construction are shown in exploded relation to illustrate how they cooperate with one another to surround and enclose the opposing end portions of the pipes;

FIG. 3 is an enlarged vertical sectional view taken axially of the pipes substantially along the line 3—3 of FIG. 1 and illustrating, in accordance with a first embodiment of the invention, the construction of the embedded hollow members or radiators which define the fluid passageways within the respective blocks;

FIG. 4 is a fragmentary sectional view similar to FIG. 3, but taken substantially along the line 4—4 of FIG. 1;

FIG. 8 is fragmentary sectional view similar to FIG. 4, but showing the jacket construction as applied to another type of flanged end pipe coupling;

FIG. 9 is an exploded perspective view showing a form of the jacket construction of this invention as applied to another type of pipe coupling;

FIG. 10 is a top plan view of one of the jacket blocks of FIG. 9, with the pipe coupling positioned therein and shown partially in section; and FIG. 11 is a transverse sectional view through an assembled pair of the jacket blocks of FIG. 9, the pipe coupling therein being shown partially in section.

Figures 5, 6:
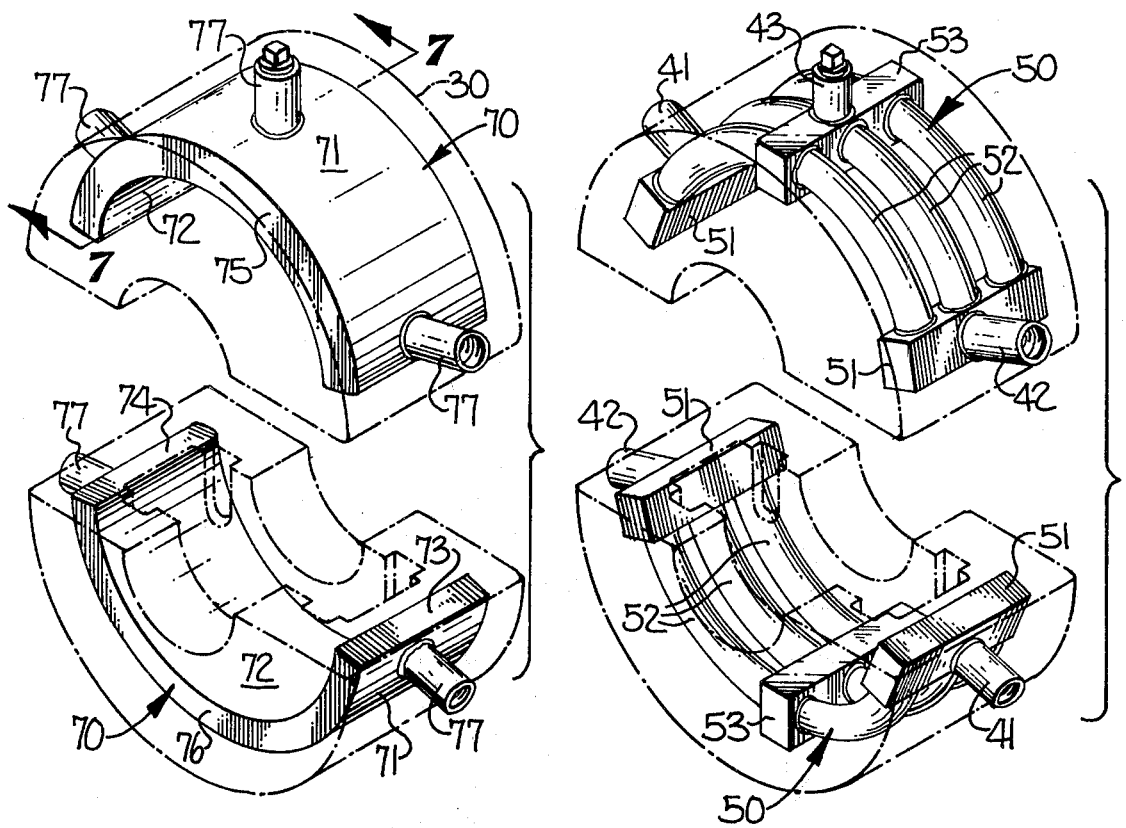
FIG. 5 is an enlarged perspective view of the cooperating pair of blocks of FIG. 2, but showing the blocks in broken lines to illustrate the respective hollow members or radiators defining the fluid passageways in the blocks, with the hollow members being shown in solid lines.
FIG. 6 is a view similar to FIG. 5 but showing the construction of the hollow members or radiators in accordance with a second embodiment of the invention.
Figure 7:
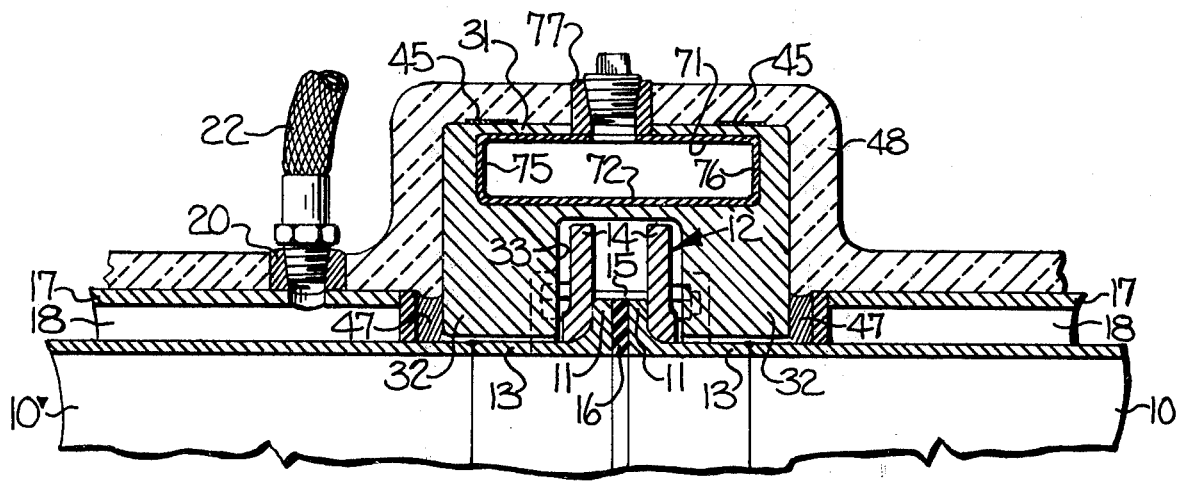
FIG. 7 is an enlarged fragmentary vertical sectional view similar to FIG. 3, but showing the hollow member or radiator in accordance with the second embodiment of the invention.

Referring more particularly to the drawings, the jacket construction in accordance with one form of the invention is illustrated in FIGS. 1–5, as applied to a coupling for a pair of flanged end pipes 10. As illustrated, the pipes 10 are interconnected in fluid communication in a manner that is well known in the art with the enlarged circumferential flanges 11 at terminal ends of the pipes being positioned in opposing relation and being interconnected by fastener means, generally indicated at 12. In the embodiment illustrated, the flanges 11 are integrally formed at one end of a tubular end member 13, which member forms the terminal end portion of the pipe 10 and which is welded or otherwise suitably secured to the medial portion of the pipe.

The fastener means 12 emplyed for maintaining the flanged end portions of the pipes 10 in opposing sealing relation includes a pair of annular draw rings 14 positioned loosely surrounding the terminal end portion of each pipe 10 in opposing relation to one another and a plurality of bolts 15 extending through the opposing draw rings 14 at spaced locations therearound. The bolts 15 force the draw rings 14 toward one another into engagement with outer peripheral portions of the flanges 11 to thereby secure the pipes tightly together. Suitable gasket material 16 is positioned between the opposing sealing surfaces of the two flanges 11 to insure a fluid-tight seal and to compensate for any slight angular misalignment between the two pipes 10.

It will thus be seen that the opposing end portions of the pipes 10 and the fastener means 12 cooperating therewith, including the draw rings 14, the bolts 15 and the gasket material 16, collectively define an enlarged pipe coupling communicatively interconnecting the two pipes 10 in fluid-tight sealing relation.

As illustrated, jacket means in the form of a surrounding sleeve 17 extends along medial portions of the pipes 10 and terminates adjacent the flanged end portions thereof. The sleeve 17 defines an annular passageway 18 around the pipes 10 for circulation of a heat-transferring fluid therethrough. Outlet and inlet ports 20 and 21, respectively, are provided in the jacket for each pipe for circulating the heat-transferring fluid into and through the respective passageways 18 thereof.

Referring now more particularly to the jacket construction which cooperates with the pipe coupling for directing a temperature controlling fluid into heat-transferring relation thereto, it will be noted that this jacket construction comprises a pair of blocks 30 of symmetrical generally semicylindrical construction and substantially equal size. The blocks 30 are preferably molded or cast from a heat conductive material such as aluminum alloy and are correspondingly shaped, with each having a cavity on the inner surface portion thereof in the form of a circumferentially extending recessed channel 33, the channels cooperating to collectively define a cylindrical chamber which receives and substantially surrounds and encloses the opposing end portions of pipes 10 and the fastener means 12 associated therewith.

Each semicylindrical block 30 includes a circumferentially extending body portion 31, seen best in cross-section in FIGS. 3 or 4, which extends alongside the circumferential periphery of the draw rings 14, and a pair of spaced apart leg portions 32 extending radially inwardly from the body portion 31 in straddling relation alongside the radially extending endmost portions thereof, with the leg portions 32 defining therebetween the previously noted recessed channel 33 on inner surface portions of the block 30. The channel 33 is of predetermined width and depth corresponding substantially to the axial and radial dimensions of the opposing draw rings 14 so as to receive the draw rings therein in closely conforming, heat-transferring relation with inner wall portions of the block 30.

It will be noted that the radially extending surfaces of the leg portions 32 which define the sides of the channel 33 have axial recesses 34 provided therein arranged in opposing pairs for receiving end portions of the bolts 15 which protrude axially from opposite sides of the draw rings 14. The number of bolts employed for securing the draw rings 14 generally varies depending upon the diameter of the pipe. In the construction illustrated, four substantially equally spaced apart bolts 15 are employed, and in each block 30 there are provided two opposing pairs or sets of recesses 34. In larger constructions where six or eight or more bolts are provided, additional pairs of recesses are provided in each block at appropriate locations along the surface of the leg portions 32.

Each block 30 has an arcuately curved fluid passageway 40 extending circumferentially through the body portion 31 thereof alongside the bottom of the circumferentially extending channel 33. The passageway 40 is provided with inlet and outlet ports 41 and 42 adjacent opposite ends of the fluid passageway for circulation of a temperature controlling fluid through the passageway. Since the inner surface portions of the block preferably substantially conform to the shape of the coupling positioned therein, it follows that the temperature controlling fluid is directed into heat-transferring relation to the opposing end portions of the pipes 10 and to the fastener means 12 associated therewith.

In order to circulate the aforementioned temperature controlling fluid through each passageway 40, it will be observed that inlet and outlet ports 41 and 42 are provided in the form of tubular members projecting from the blocks 30, with each port having corresponding ends of respective conduit means 22, 23, 24 connected thereto. As illustrated, outlet port 20 in the jacket for the pipe shown to the left of the figures is connected by conduit 22 to the inlet port 41 for the upper illustrated block 30, while inlet port 21 for the right-hand illustrated pipe is connected by conduit 23 to the outlet port 42 for the lower illustrated block 30. Conduit 24 bridges or interconnects the remaining outlet and inlet ports for the two mating blocks 30 to thereby provide a path for the continuous circulation of temperature controlling fluid through the jackets of the pipes and through the two cooperating blocks 30.

The temperature controlling fluid may be of various kinds depending upon the type of fluid being conveyed through the fluid conveying system. For example, the temperature controlling fluid being circulated through the passageways 40 may take the form of steam, oil, water, refrigerant, etc.

In addition to the inlet and outlet ports 41, 42 previously mentioned, an additional intermediate port 43 may optionally be provided in each block 30 communicating with the fluid passageway 40 and located about midway between the inlet and outlet ports 41, 42. As illustrated, this optional additional port 43 is plugged. However, in many installations it may be desirable to use this additional port for connecting a drain or condensate trap thereto, or for connecting a vent or additional inlet for supply of temperature controlling fluid.

The blocks 30 are held in cooperating abutting relation surrounding the coupling by any suitable means, preferably a detachable means such as the strapping 45 illustrated. Before installing the blocks in position around the coupling, a heat conductive filler material or cement 47 is preferably positioned between the blocks and the pipe to fill or substantially fill such voids as may remain between the pipe and the blocks when the blocks are installed to thereby facilitate conduction of heat between the pipes 10 and the blocks 30.

As illustrated, the blocks 30 essentially straddle the coupling with the leg portions 32 of the blocks contacting the nonjacketed portions of the pipe 10 adjacent the ends of the pipes to thereby facilitate maintaining a uniform temperature along the pipe both in the jacketed medial portions thereof and also at the coupling and along the adjacent nonjacketed portions of the pipe 10. As illustrated a suitable, preferably relatively thick, layer of insulation 48 is applied to the exterior surfaces of the sleeves 17 as well as to the exterior surfaces of the cooperating blocks 30.

As stated earlier, each jacket block 30 is preferably formed of cast metal such as aluminum alloy, and has a fluid passageway 40 extending generally circumferentially therethrough. Because of the brittle or frangible nature of the usual types of cast aluminum alloy, it is preferred that each block have a hollow member or radiator 50 embedded therein which defines the respective fluid passageway or chamber 40 through the block. Of course, if the strength properties and other physical characteristics of the metal forming the blocks are adequate, the hollow members may be omitted and the fluid passageways 40 may be defined by a void formed within the blocks.

In accordance with the preferred form of the invention as illustrated in FIGS. 3–5, the hollow member or radiator 50 in each block preferably includes a pair of generally rectangular hollow shell-like headers 51 embedded in the block 30 at circumferentially spaced locations from one another. Tubular members in the form of threaded nipples joined to the headers by suitable means such as welding define the respective inlet and outlet ports 41, 42. A plurality of arcuately curved tubes 52 are also suitably joined to the headers and provide a path of fluid communication between the inlet and outlet ports 41, 42. As illustrated in FIG. 5, an additional header 53 is also provided about midway between the endmost headers 51 with the previously noted optional additional port 43 being provided in this additional medial header 53.

The second embodiment of the invention differs over the previously described first embodiment only in the construction of the hollow member which is embedded within the blocks 30. To avoid repetitive description, only this hollow member will be described in detail, the other illustrated elements of the jacket construction and th fluid conveying system which correspond to elements previously described being identified by the same reference characters previously employed.

Referring more particularly to FIG. 6, it will be seen that the hollow member 70 in accordance with the second embodiment of the invention is in the form of an arcuately curved generally semicylindrical hollow shell including outer and inner circumferential walls 71, 72, radial end walls 73, 74, and arcuate radial side walls 75, 76. These walls are preferably of relatively thin sheet material such as sheet steel and are welded together along the adjoining edges or seams. Nipples 77 are welded to the outermost circumferential wall 71 at arcuately spaced locations and define the inlet and outlet ports 41, 42 and the optional medial port 43.

It will be understood that the jacket construction of this invention may be applied to various types and forms of pipe couplings. Referring to FIG. 8, for example, it will be noted that the jacket 30 is illustrated as applied to a type of pipe coupling wherein the flanged ends of the pipes are bolted directly together. Since the structure of the jacket 30 illustrated in FIG. 8 is essentially as that shown in FIG. 4, the same reference characters will be employed for the jacket, and the same reference characters with prime notation added will be employed for the fluid conveying system. Referring more particularly to the fluid conveying system, it will be seen that the pipes 10' are essentially the same as that illustrated in FIG. 4 except that the flanges 11' thereof are somewhat longer and are bolted directly together by bolt means 15'.

FIGS. 9 through 11 illustrate the application of the jacket construction of this invention to a somewhat different type of pipe coupling. The illustrated coupling, known as "Grayloc" coupling, is particularly adapted for high pressure applications. As illustrated, the coupling interconnects two pipes 110. The coupling includes a pair of specially formed pipe end portions 113, each having angularly disposed outer circumferential peripheral portions 113a serving as a camming surface to cooperate with inner surface portions of a pair of clamping members 114. The clamping members have lug portions 114a on opposite sides thereof alongside the pipes through which bolts 115 extend to secure the clamping members together. The clamping members 114 thus force the sealing surfaces of the pipe end portions 113 toward one another and into engagement with a ring-like seal or gasket 116.

Referring more particularly to the jacket construction in accordance with this form of the invention, it will be seen that the jacket comprises a pair of similarly shaped cast blocks 130 formed from a heat conductive material such as aluminum alloy. Each block has a cavity 133 on the inner surface portion thereof of a predetermined configured shape, with the respective cavities of the pair of blocks cooperating to collectively define a hollow chamber which receives the coupling therein. The cavity 133 of the blocks substantially conforms to the exterior periphery of one of the repective clamping members 114, with each cavity including a recessed well area 134 on opposite sides of the pipes for receiving the outwardly extending lug portions 114a of the clamping members and the bolts 115 which extend therethrough. Thus the coupling is surroundingly enclosed within the cooperating blocks 130 in closely conforming heat-transferring relation with the inner surface portions thereof. As with the previously described form of the invention, a heat conductive filler or cement (not shown) may be positioned between the blocks 130 and the coupling in order to fill most or all such voids as may remain between the coupling and the blocks when the blocks are installed to thereby facilitate good conduction of heat between the pipes and the blocks 130.

Each block 130 has a fluid passageway 140 extending therethrough and inlet and outlet ports 141 and 142 adjacent opposite ends of the fluid passageway for circulation of a temperature controlling fluid through the passageway. Preferably, the passageway 140 is defined by a hollow member or radiator 150 embedded in and surrounded by the block. This hollow member may take the form of a hollow shell, as illustrated, or may be of the general type illustrated in FIGS. 1–5 wherein a pair of spaced apart hollow shell-like headers are interconnected by a plurality of tubular members.

It will be understood, of course, that if the strength properties and other physical characteristics of the metal forming the blocks are adequate, the hollow members may be omitted and the fluid passageways 140 may be defined by a void formed within the blocks.

The pair of blocks 130 are held in cooperating relation surrounding the coupling by suitable fastening means 145, which, as illustrated in FIGS. 9–11, takes the form of four bolts which extend through suitably located holes 148 formed at the four corners of the generally rectangular shaped blocks 130.

It is thus seen that I have provided several forms of an improved jacket construction to aid in maintaining a fluid flowing through a pipeline at a desired temperature at locations where pipes are interconnected by a coupling. The jacket construction is simple and may be readily installed on existing pipelines without requiring modifications thereto. Further, the jacket construction may be readily removed from the pipeline at any time, if desired, to permit disconnecting the pipes at the flanged joint for maintenance or for making modifications, after which the jacket construction may be readily reinstalled. Further, it will be readily appreciated that the jacket of this invention may be produced for use in conjunction with types of couplings having external configurations other than the forms specifically illustrated herein, it being necessary only to vary the contour or shape of the coupling-receiving cavity in the respective blocks.

In the drawings and specification, there have been set forth preferred embodiments of the invention, and although specific terms are employed, they are used in a generic and descriptive sense only and not for purposes of limitation.

That which is claimed is:

1. In a fluid conveying system including a pair of pipes having opposing end portions positioned in fluid communication and fastener means cooperating with the opposing end portions of the pipes to releasably secure the pipes together in fluid-tight relation, the opposing end portions of the pipes and the cooperating fastener means collectively defining an enlarged coupling having a predetermined external surface configuration substantially larger than adjoining portions of said pipes, the combination therewith of means cooperating with said enlarged coupling for directing a temperature controlling fluid into heat-transferring relation thereto, said means comprising a plurality of blocks of heat conductive material cooperating with one another to substantially surround and enclose the opposing end portions of said pipes and the fastener means associated therewith, inner surface portions of each block being concave and defining a cavity therein of predetermined shape, the respective cavities of the cooperating blocks collectively defining a hollow chamber substantially conforming to said predetermined external surface configuration of said enlarged coupling so as to receive the coupling in heat-transferring relation therein, and each block also having an enclosed fluid passageway therein extending alongside said cavity and having inlet and outlet ports communicating with the enclosed fluid passageway for circulation of a temperature controlling fluid therethrough, and means associated with said plurality of blocks for securing the blocks in cooperating substantially surrounding relation to said opposing end portions of said pipes and the fastener means associated therewith.

2. A structure according to claim 1 wherein each of said blocks has a body portion extending alongside of and generally circumferentially surrounding the outer peripheral portions of said coupling and a pair of axially spaced apart leg portions extending generally radially inwardly from said body portion in straddling relation alongside the endmost peripheral portions of said coupling.

3. A structure according to claim 2 wherein the fluid passageway in each block is located in said body portion thereof.

4. A structure according to claim 1 including a hollow member of thin-wall heat conductive material defining the fluid passageway in each of said blocks, and the walls of each block being molded around the hollow member.

5. A structure according to claim 4 wherein said hollow member includes a pair of hollow headers embedded in said block at spaced locations from one another and each communicating with one of said inlet and outlet ports, and a plurality of elongate tubular members extending through said block alongside said cavity and communicatively interconnecting said pair of headers.

6. A structure according to claim 4 wherein said hollow member comprises a hollow shell of relatively thin sheet steel with said inlet and outlet ports communicating therewith adjacent opposite ends thereof.

7. A structure according to claim 1 wherein the opposing end portions of said pair of pipes include opposing circumferentially extending flanges located at the terminal ends of each pipe, and wherein said cavities on inner surface portions of said blocks comprise circumferentially extending channels receiving said opposing circumferentially extending flanges therein.

8. A structure according to claim 7 wherein said fastener means comprises a plurality of bolts extending axially through said opposing circumferentially extending flanges, and wherein the inner surface portions of said blocks defining the sides of said channels are provided with recesses therein receiving the end portions of said bolts extending from the flanges so that inner surface portions of the blocks are positioned in closely conforming relation to the flanges.

9. A structure according to claim 7 wherein said fastener means includes respective annular draw rings loosely surrounding the end portion of each pipe in abutting engagement with said circumferentially extending flange thereof, said draw rings being positioned in opposing relation with one another, and a plurality of bolts extending axially through the opposing annular draw rings and securing the pipes together in fluid-tight sealing relation, and wherein said blocks are substantially U-shaped in cross section and the inner surface portions of said blocks defining the sides of said channels substantially conform to the sides of said opposing draw rings and are provided with axial recesses therein receiving the end portions of said bolts extending axially from the sides of the draw rings.

10. A structure according to claim 1 wherein the opposing end portions of said pair of pipes have angularly disposed camming surfaces on the respective circumferential peripheries thereof, and wherein said fastener means includes a pair of clamping members positioned on opposite sides of said pair of pipes overlying the opposing end portions thereof and engaging said camming surfaces, said clamping members including lug portions extending outwardly alongside the pipes, and a plurality of bolts extending through the lug portions of said clamping members and securing the clamping members and said pair of pipes tightly together, and wherein said cavities on the inner surface portions of said blocks substantially conform to the exterior peripheries of said clamping members and include recessed wells on opposite sides of the pipes receiving said lug portions and the bolts extending therethrough.

11. In a fluid conveying system including a pair of pipes having opposing end portions positioned in fluid communication, fastener means cooperating with the opposing end portions of the pipes to releasably secure the pipes together in fluid-tight sealing relation, the opposing end portions of the pipes and the cooperating fastener means collectively defining an enlarged coupling having a predetermined external surface configuration, and jacket means extending along said pipes in surrounding relation thereto and adapted for circulation of a temperature controlling fluid into heat-transferring relation with the pipes, the combination therewith of means cooperating with the enlarged coupling for directing a temperature controlling fluid into heat-transferring relation thereto, said means comprising a pair of similarly shaped cast blocks of heat conductive material cooperating with one another from opposite sides of pipes to substantially surround and enclose the opposing end portions of said pipes and the fastener means associated therewith, each block having a body portion extending in closely conforming heat-transferring relation circumferentially along the outer peripheral surfaces of said coupling and having a pair of spaced apart leg portions extending inwardly from the body portion in straddling relation alongside the endmost peripheral portions of said coupling, each block having an enclosed fluid passageway extending therethrough with inlet and outlet ports for circulation of a temperature controlling fluid through the passageway, and means cooperating with said pair of blocks for securing the blocks in cooperating substantially surrounding relation to said opposing end portions of said pipes and the fastener means associated therewith.

12. In a fluid conveying system including a pair of pipes having opposing end portions positioned in fluid communication, fastener means cooperating with the opposing end portions of the pipes to releasably secure the pipes together in fluid-tight sealing relation, the opposing end portions of the pipes and the cooperating fastener means collectively defining an enlarged coupling having a predetermined external surface configuration substantially larger than adjoining portions of said pipes, and each pipe having jacket means extending along the pipe in surrounding relation thereto with non-jacketed portions adjacent said end portions, said jacket means being adapted for circulation of a temperature controlling fluid into heat-transferring relation with the pipes, the combination therewith of means positioned between the jacketed portions of said pipes and substantially surrounding and enclosing said enlarged coupling and cooperating therewith and with said non-jacketed portions of said pipes for directing a temperature controlling fluid into heat-transferring relation thereto, said means comprising a cooperating pair of symmetrically shaped cast blocks of substantially equal size having cooperating concave inner surface portions collectively defining a hollow chamber substantially conforming to said predetermined external surface configuration of said enlarged coupling so as to receive the coupling therein in effective heat-transferring relation with the blocks, a hollow member of relatively thin heat conductive material embedded within each cast block and surrounded by the block and defining a fluid passageway through the block, said hollow member being provided with inlet and outlet ports for circulation of the temperature controlling fluid through the hollow member, and means carried by said pair of blocks for positioning the same in predetermined cooperating relation around the interconnected pipes.

* * * * *